US009884792B2

(12) United States Patent
Puri et al.

(10) Patent No.: US 9,884,792 B2
(45) Date of Patent: Feb. 6, 2018

(54) UREA-BASED FERTILIZER COMPOSITION AND A PROCESS THEREOF

(75) Inventors: Micky Prashant Puri, Maharashtra (IN); Kishore Kumar Singh, Uttar Pradesh (IN); Anand Kumar Srivastava, Ullar Pradesh (IN); Anand Kishore Gupta, Uttar Pradesh (IN); Sanjaya Mohapatra, Maharashtra (IN); Rahul Jadhav, Maharashtra (IN)

(73) Assignees: ADITYA BIRLA NUVO LIMITED, Mumbai, Maharashtra (IN); ADITYA BIRLA SCIENCE AND TECHNOLOGY CO. LTD., Mumbai, Maharashtra (IN)

( * ) Notice: Subject to any disclaimer, the term of this patent is extended or adjusted under 35 U.S.C. 154(b) by 1090 days.

(21) Appl. No.: 14/655,950

(22) PCT Filed: Nov. 28, 2011

(86) PCT No.: PCT/IN2011/000815
§ 371 (c)(1),
(2), (4) Date: Sep. 11, 2015

(87) PCT Pub. No.: WO2012/172558
PCT Pub. Date: Dec. 20, 2012

(65) Prior Publication Data
US 2016/0009603 A1 Jan. 14, 2016

(30) Foreign Application Priority Data

Jun. 13, 2011 (IN) .......................... 1721/MUM/2011

(51) Int. Cl.
C05C 9/00 (2006.01)
C05G 3/00 (2006.01)

(52) U.S. Cl.
CPC ................ *C05C 9/00* (2013.01); *C05C 9/005* (2013.01); *C05G 3/0041* (2013.01); *C05G 3/0064* (2013.01)

(58) Field of Classification Search
None
See application file for complete search history.

(56) References Cited

U.S. PATENT DOCUMENTS

| | | | |
|---|---|---|---|
| 6,315,807 B1 | 11/2001 | Patra | |
| 6,336,949 B1 | 1/2002 | Patra | |
| 7,722,695 B2 | 5/2010 | Viadya | |

FOREIGN PATENT DOCUMENTS

| | | |
|---|---|---|
| AU | 201100812 | 8/2011 |
| IN | 185675-537BOM1995 | 3/2001 |
| IN | 190909-223DEL1999 | 8/2003 |
| JP | 2002-80290 | 3/2002 |
| JP | 2005-82513 | 3/2005 |

OTHER PUBLICATIONS

Gould W.D. et al, "Urea Transformations and Fertilizer Efficiency in Soil", Advances in Agronomy, vol. 40, Biotechnology Section, CANMET, Energy Mines and Resources, Ottawa, Ontario, Canada K1A 0G1; Allied Corporation, Syracuse Research Laboratory, Solvay, NY 13209; Copyright 1986 by Academic Press, Inc., pp. 209-238.
Ram, Muni, et al., "Nitrification Inhibitory Properties in Mentha-Spent and Pyrethrum Flowers", Journal of the Indian Society of Soil Science . . . , vol. 41, No. 1, pp. 176-177 (1993); Department of Agronomy and Soil Science, Central Institute of Medicinal and Aromatic Plants, Lucknow, U.P. 226016;www.indianjournals.com; Accepted Nov. 1992.
Prasad et al; "Nitrification Inhibitors for Agriculture, Health and the Environment"; Division of Agronomy, Indian Agricultural Research Institute, New Delhi, India; U.S. Dept. of Agriculture, Agricultural Research Service, Univ. of Nebraska, Lincoln, Nebraska; Advances in Agronomy, vol. 54. Academic Press, 1995, pp. 233-281.
Prasad et al., "Nitrification Retarders and Slow-Release Nitrogen Fertilizers"; Division of Agronomy, Indian Agricultural Research Institute, New Delhi, India; Present Address: Dept. of Agronomy, Punjabrao Krishi Vidyapeeth, Akola, Maharashtra, India.
Prasad et al;, "Pusa Neem Golden Urea for Increasing Nitrogen Use Efficiency in Rice", Current Science, vol. 75, No. 1, Jul. 10, 1998.
Sahrawat, K.L.; Effects of Nitrification Inhibitors on Nitrogen Transformations, Other Than Nitrification, in Soils; Advances in Agronomy, vol. 42 ; International Crops Research Institute for the Semi-Arid Tropics Icrisat Patancheru P.O., Andhra Pradesh 502 324, India; Journal Article No. 705; Academic Press, Inc., 1989.
International Search Report dated May 31, 2012 for PCT/IN2011/00815.

*Primary Examiner* — Wayne Langel
(74) *Attorney, Agent, or Firm* — Gottlieb, Rackman & Reisman, PC

(57) ABSTRACT

A urea-based slow-release fertilizer composition comprising an alkaline oil component and a urea component, wherein, the alkaline oil component is coated on the urea component, such that the ratio of the alkaline oil component to the urea component is in the range of 0.01:100 to 0.1:100. The fertilizer is cost-effective, easy-to-use, and its quality is maintained during storage and transport.

6 Claims, No Drawings

UREA-BASED FERTILIZER COMPOSITION AND A PROCESS THEREOF

FIELD OF DISCLOSURE

The present disclosure relates to a fertilizer composition and a process thereof. Particularly, the present disclosure relates to a urea-based fertilizer composition and a process thereof.

BACKGROUND

Urea or carbamide is an organic compound comprising two amine ($-NH_2$) groups joined by a carbonyl ($C=O$) functional group. It is widely used in fertilizers as a convenient source of nitrogen. However, urea is highly soluble in water which causes the compound to leach into ground or surface water causing low retention in the fertilizer and thereby resulting in reduced fertilizer efficiency. The leaching of urea in surface water causes Eutrophication resulting in a drastic increase in phytoplankton effecting in depletion of oxygen in water and reduction in aquatic life. Further, during summer, urea is lost from the fertilizer due to volatilization where nitrogen is released to atmosphere as ammonia gas. Also, a portion of urea is lost as nitrous oxide due to denitrification under reduced conditions by denitrifying bacteria in the soil. This way up to 60% of the nitrogen in urea is lost to the surrounding causing environmental hazards and a corresponding increase in fertilizer usage.

Several measures have been taken to reduce this loss of urea into the surrounding. Firstly, by applying small amounts of urea to the crop/plant at different growth stages, the nitrogen can be used before being lost. Secondly, by impregnating the urea-based fertilizer deeper into the soil, the loss of nitrogen to the surrounding can be alleviated by retaining the nitrogen in the form of ammonium in the complex of the soil particles. Certain modern technologies use urease inhibitors such as phenylphosphorodieamidate, hydroxamates and benzoqauinones (Gould, W. D. et. al., Adv. Agron. 40: 209-238, 1986). These inhibitors reduce the hydrolysis of urea, thereby reducing loss of ammonia due to volatilization. Further, use of nitrification inhibitors such as N-serve or nitrapyrin (2-chloro-6 (tricholoromethyl)-pyridine), dicyandiamide, 2-amino 4-chloro-6-methylpyrimidine, potassium azide and thiourea has also been suggested to overcome the listed drawbacks. (Sahrawat, Adv. Agron 42: 279-302, 1989; and Prasad and Power, Adv. Agron 54: 233-81, 1995). These compounds although effective are costly and not readily available, which limits their applicability on a large-scale.

Another known method for reducing loss of nitrogen from the fertilizer to the surrounding is by using neem seed cake or neem cake coated urea, where, the naturally occurring neem is found to exhibit nitrification inhibiting properties (Prasad, et. al., Adv. Agron 23: 337-381, 1971). Neem is cheap and readily available in India, therefore favorable for use in India. Neem bittern/extracts such as Nimin and Neemex have been used for incorporation with urea. More recently use of a neem oil urea emulsion adduct is disclosed (Prasad, et. al. Curr. Sci. 75: 15, 1998). Further, Karanjin from Karanj (*Pangarnla glabra*), tea waste, and medicinal plant product waste like waste of Pyrethrum flower (*Crysanthaxium cinerariefolium*) have also been reported to retard nitrification (Sahrawat, et. al., Adv. Agron. 42: 279-309, 1989; and Ram, et. al., Indian Soc. Soil Sci. 41: 176-177, 1993). Neem oil/karania oil coated urea enhances the self-life of urea, reduce caking during storage, and increase nitrogen availability to the plants.

The ingredients present in neem seeds/karanja seeds not only act as a natural fertilizer with pesticidal properties but also act as a nitrification inhibitor, which results in slow-release of nitrogen from the fertilizer during the period of crop growth. Also, these ingredients increase the efficiency of the nitrogen-release fertilizer thus considerably decreasing the amount of fertilizer application required and thereby reducing the fertilizer cost. Further, these natural ingredients considerably improve the soil quality and protect the soil during droughts, thus, enhancing the crop yield. Also, since nitrogen does not seep into water bodies, the environmental impact is reduced.

Very often these adapted fertilizers, especially having synthetic chemicals, are limitedly used, on turfs, golf courses, landscapes, parks, or in floriculture, due to their slow-release properties. Because of the expense involved, the application of these fertilizers is not feasible on a large-scale. Several attempts have been made in the past to provide slow-release fertilizers, some of the disclosures are listed in the prior art below.

JP Patent No. 2002080290 discloses an environmentally friendly granular fertilizer which is preserved during storage from insect break-outs by combining at least one material selected from neem organ after the neem oil is extracted, neem oil, and neem grounds with the granulated fertilizer composition also containing at least one material selected from crab shell and shrimp shell.

U.S. Pat. No. 6,315,807 discloses a novel formulation useful as a nitrification and urease inhibitor, said formulation comprises an effective amount of nitrogenous fertilizer, castor oil, and oil derived from *Artemisia Annua* in an amount sufficient to inhibit the nitrification in the formulation, a method for producing the formulation, and a method for applying the formulation to soil are also disclosed.

U.S. Pat. No. 6,336,949 discloses a novel composition for a slow release nitrogenous fertilizer comprising about 0.5-1% of an inert material and 0.5-1% of essential oil or their derivatives (on weight basis), and a process for manufacturing the composition thereof. To manufacture the composition as disclosed in U.S. Pat. No. 6,336,949 it takes more than 24 hrs.

U.S. Pat. No. 7,722,695 discloses a neem based composition for coating a nitrogenous fertilizer. The method for making the composition comprises mixing neem extract, neem oil, and binders with an organic solvent to obtain the neem based composition which is then coated on urea. A drawback of this method is that since the neem based composition is only superficially adhered to the urea there is a possibility of the coating coming off during storage and transportation of the fertilizer.

The disclosures listed in the prior art generally coat urea by spraying neem oil or applying a neem oil emulsion on the urea surface. The composition is typically provided as prills or beads and packed in hydrophobic polythene bags. During storage and transportation, the oil coated on the urea surface adsorbs on to the hydrophobic surface of the polythene bag, resulting in loss of the neem ingredient and thus degrading the fertilizer quality. The present invention therefore aims at providing a slow-release urea-based fertilizer which overcomes the above-listed drawbacks.

OBJECTS OF THE INVENTION

An object of the present invention is to provide a urea-based slow-release fertilizer composition and a process for making the fertilizer composition thereof.

Another object of the present invention is to provide a urea-based slow-release fertilizer whose quality is maintained during storage and transport.

Yet another object of the present invention is to provide a urea-based slow-release fertilizer which is easy-to-use.

One more object of the present invention is to provide a stabilized neem oil emulsion easily applicable and retainable on a urea composition.

Yet one more object of the present invention is to provide a urea-based slow-release fertilizer which is cost-effective.

Still one more object of the present invention is to provide a process for manufacturing urea-based slow-release fertilizer which conserves water by using reclaimed water.

SUMMARY OF THE INVENTION

In accordance with the present invention, is disclosed a urea-based slow-release fertilizer composition, said composition comprising:
- an alkaline oil component having neem oil concentration in the range of 2-98 wt %; and
- a urea component in a form selected from prills, pills, beads, pellets, grains, and tablets;
- wherein, the ratio of the alkaline oil component to the urea component is in the range of 0.01:100 to 0.1:100.

Typically, in accordance with the present invention, said alkaline oil component comprises a combination of oils selected from neem, karanjin and karanja.

In accordance with the present invention, is disclosed a process for making a urea-based slow-release fertilizer, said process comprising the steps of:
- adding an oil component having neem oil concentration in the range of 2-98% to an aqueous alkali having pH in the range of 7-14 and stirring the resultant mixture to obtain an alkaline oil emulsion component;
- coating the alkaline oil emulsion component on a hot urea component having temperature between 50-90° C. by a method selected from the group of methods consisting of spraying, immersing, dispersing, and sprinkling, to obtain a coated urea component; and
- drying the coated urea component by means of hot air to obtain the urea-based slow-release fertilizer.

Typically, in accordance with the present invention, the process for making a urea-based slow-release fertilizer includes the step of adding the oil component to the aqueous alkali in a ratio in the range of 1:0.1 to 1:10.

Preferably, in accordance with the present invention, the process for making a urea-based slow-release fertilizer includes the step of adding a surfactant to the alkaline oil emulsion component.

DETAILED DESCRIPTION OF THE INVENTION

The present invention envisages a urea-based slow-release fertilizer composition comprising an alkaline oil component and a urea component in a ratio in the range of 0.01:100 to 0.1:100. The urea component is typically in the form of prills, pills, beads, pellets, grains, or tablets. The urea component is coated with the alkaline oil component; wherein, the alkaline oil component is made in the form of an alkali-based emulsion having pH in the range of 7-14 and comprising the oil component and the aqueous alkali ratio in the range of 1:0.1 to 1:10, typically 1:1. The alkaline oil component has a neem oil concentration in the range of 2-98%. The alkali-based emulsion is coated on hot urea component, by spraying, dispersing, immersing or sprinkling, so as to preserve both the water-soluble and the water-insoluble ingredients of the neem oil on the urea. This coating on the surface of the urea component helps to increase the organic matter content in soil and improving the fertility of soil, reduce the pH of the soil by inhibiting urease enzymes, and enhances the performance of the urea-based fertilizer.

The active ingredients of neem, present in neem oil, are typically used in the coating over urea. Further, combination of oils, with or without neem oil, but comprising the active ingredient Azadirachitin from neem may be used. Neem oil contains Azadirachtin 300-3000 ppm, Salannin 300-6000 ppm and Nimbin 400-4000 ppm, among other compounds such as Tetranortriterpenoids. Some of these active ingredients are water-soluble and some of these active ingredients are water-insoluble. The process of the present invention aims at retaining both these ingredients on the urea surface, long after the deposition of the oil component, by: adding the oil component, which comprises neem oil concentration in the range of 2-98% and optionally comprises a combination of oils selected from karanja, karanjin, and neem, to an aqueous alkali (pH 7-14); stirring the resultant mixture for a predetermined duration to effect the dissolution of the water-soluble ingredients therein and thereby stabilizing the mixture and effecting emulsification. The alkaline oil emulsion component is then disposed on hot urea component having temperature between 50-90° C. to cause the oil-water "miscelles" to break and flash the moisture, thereby, drying and preserving a uniform overcoat of the alkaline oil component thereon, such that the ratio of the alkaline oil component to the urea component is in the range of 0.01:100 to 0.1:100. For e.g. 0.4-5 liters of oil component is used for 1000 kg of urea component.

The alkaline oil component on urea helps in retarding the activity and growth of the bacteria responsible for denitrification and inhibits the activity of urease enzyme which results in a slow release of the ammonium ions and the nitrogen is therefore made available to the crop at a controlled rate. Further, the loss of urea due to seepage or loss to atmosphere is prevented. Still further, neem has pesticidal properties which help in preventing infestation from pests like caterpillars, beetles, leafhoppers, borer, mites, etc. Other benefits include: excellent soil conditioning, natural or bio pesticides, environmental friendly, non-toxic, reduce fertilizer consumption, easy-to-use, skin friendly, and non-staining, enhances soil fertility, and increases crop yield.

Neem oil or karanja oil extracted in different ways or by using different solvents have an impact on the performance of the urea component coated thereof. When oil is extracted mechanically by a conventional process or with certain non-polar solvents, most of the polar terpenoids, which act as urease inhibitor, are left in the seeds. Subsequently, de-oiled seed powder can be soaked in methanol to extract these polar terpenoids, which may be used in the urea coating as such or blended with the recovered oil to get enhanced performance.

The method of coating the surface of urea component with the alkaline oil component comprises the steps of: mixing 0.1-2% ammonia solution with water to obtain an aqueous alkali, optionally a surfactant may be added; adding an oil component having neem oil concentration in the range of 2-98% to the aqueous alkali to form an alkaline oil emulsion component; coating the alkaline oil emulsion component on the surface of hot urea component coming out of a urea manufacturing tower and having temperature in the range of 50-90° C. to obtain a coated urea component; and drying the coated urea component by means of hot air to avoid agglomeration, thereby producing the urea-based slow-release fertilizer of the present invention. The amount of the ammonia solution used, typically in the range of 0.1-2%, must be such that the pH of the resulting aqueous alkali is greater than 7.0. The neem oil concentration can be varied in the range of 2-98% and the ratio of the alkaline oil component to the alkaline water is in the range of 1:0.1 to 1:10, preferably 1:1.

Test Results

The invention will now be described with respect to the following examples which do not limit the scope and ambit of the invention in anyway and only exemplify the invention.

Example 1

360 liters of neem oil was added to 330 liters of demineralized water in a vessel. The mixture was stirred for 15 to 30 minutes to allow the water-soluble ingredients of the neem oil to equilibrate in the water phase. 30 liters of ammonia solution was added to the mixture post mixing. The resultant alkaline mixture was further stirred for 30 minutes, effecting emulsification of oil and water using the fatty acids present in the oil. This alkaline emulsion is then sprayed on to hot urea prills at a rate of 180 lit/hr, wherein, the urea prills were displaced at a rate of ~136 tonnes/hr. The flow rate of the neem oil emulsion and the displacement rate of urea were maintained to achieve a minimum 350 ppm of neem oil on urea. The hot urea caused reverse miscellization whereby the water in the emulsion was flashed and the alkaline oil was deposited as a thin layer.

Example 2

300 liters of neem oil was added to 330 liters of demineralized water in a vessel. The neem oil-water mixture was stirred for 15 to 30 minutes to allow the water-soluble ingredients dissolve in the aqueous phase. 50 liters of emulsifier was added to the mixture and the mixture was stirred for 30 minutes to effect emulsification of the neem oil-water mixture. The emulsified mixture was then sprayed through spray nozzles by maintaining a flow rate of ~180 lit/hr (the flow rates may be, varied depending on desired properties of coated urea). The urea prills were displaced at a rate of ~136 tonnes/hr. The flow rate of the emulsion and the displacement rate of the urea were maintained to achieve more than 350 ppm of the neem oil on the urea. The hot urea caused reverse miscellization whereby the water in the emulsion was flashed and the oil was deposited as a thin layer.

Example 3

In a lab-scale experiment, 50 gms of neem oil was added slowly to 49.9 gms water containing 0.1 gms sodium hydroxide. The resultant mixture was stirred for 10 minutes to form an alkaline neem oil emulsion. The alkaline emulsion remained stable for more than 7 days.

Example 4

In a lab-scale experiment, 50 gms of neem oil was added slowly to 49.9 gms water containing 0.1 gms ammonia (25% aqueous solution). The resultant mixture was stirred for 10 minutes to form an alkaline neem oil emulsion. The alkaline emulsion remained stable for more than 7 days.

Example 5

In a lab-scale experiment, 50 gms of neem oil was added slowly to 49.5 gms water containing 0.05 gms ammonia (25% aqueous solution) and 0.45% high HLB surfactant (Nonyl phenol ethoxylate based). The resultant mixture was stirred for 10 minutes to form an alkaline neem oil emulsion. The alkaline emulsion remained stable for more than 7 days.

Technical Advantages

A urea-based slow-release fertilizer composition comprising an alkaline oil component and a urea component, wherein, the alkaline oil component is coated on the urea component, such that the ratio of the alkaline oil component to the urea component is in the range of 0.01:100 to 0.1:100; the composition and the process as described in the present invention has several technical advantages including but not limited to the realization of:

- an alkaline oil emulsion component, made by combining an oil component with neem oil concentration in the range of 2-98% in aqueous alkali having a pH in the range of 7-14, helps in retaining both the water soluble and the water insoluble active ingredients of neem on the urea component;
- during deposition of the alkaline oil emulsion component on the urea component the temperature of the urea component is maintained high, typically in the range of 50-90° C., this results in breaking of the oil-water "miscelles" due to the latent heat of the urea component, thereby flashing the moisture, and drying and preserving a stable and uniform overcoat of the alkaline oil component thereon; and
- aqueous effluent generated in a fertilizer manufacturing plant can be used to make the alkaline oil emulsion component, where, the aqueous effluent is generally alkaline due to the presence of traces of ammonia or alkali metal oxides/hydroxides/carbonates of urea, this helps in obtaining a stabilized emulsion without the need for adding external surfactants.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary. Wherever a range of values is specified, a value up to 10% below and above the lowest and highest numerical value respectively, of the specified range, is included in the scope of the invention.

In view of the wide variety of embodiments to which the principles of the present invention can be applied, it should be understood that the illustrated embodiments are exemplary only. While considerable emphasis has been placed herein on the particular features of this invention, it will be appreciated that various modifications can be made, and that many changes can be made in the preferred embodiments without departing from the principle of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A urea-based slow-release fertilizer composition, said composition comprising:
   an alkaline oil component having neem oil concentration in the range of 2-98 wt %; and a urea component in a form selected from the group consisting of prills, pills, beads, pellets, grains, and tablets;

wherein, the ratio of the alkaline oil component to the urea component is in the range of 0.01:100 to 0.1:100;

wherein the alkaline oil component is coated on the urea component.

2. The composition as claimed in claim 1, wherein said alkaline oil component comprises a combination of oils selected from the group consisting of neem, karanjin and karanja.

3. The composition of claim 1, wherein the urea component is maintained at a temperature between 50-90° C. when the oil component is coated on the urea component.

4. A process for making a urea-based slow-release fertilizer, said process comprising the steps of:

adding an oil component having neem oil concentration in the range of 2-98% to an aqueous alkali having pH in the range of 7-14 and stirring the resultant mixture to obtain an alkaline oil emulsion component;

coating the alkaline oil emulsion component on a hot urea component having temperature between 50-90° C. by a method selected from the group of methods consisting of spraying, immersing, dispersing, and sprinkling, to obtain a coated urea component; and drying the coated urea component by means of hot air to obtain the urea-based slow-release fertilizer.

5. The process as claimed in claim 4, which includes the step of adding the oil component to the aqueous alkali in a ratio in the range of 1:0.1 to 1:10.

6. The process as claimed in claim 4, which includes the step of adding a surfactant to the alkaline oil emulsion component.

* * * * *